United States Patent
Shim et al.

(10) Patent No.: US 12,231,269 B2
(45) Date of Patent: Feb. 18, 2025

(54) ACTIVE USER DETECTION AND CHANNEL ESTIMATION METHOD AND DEVICE, USING DEEP NEURAL NETWORK

(71) Applicant: SEOUL NATIONAL UNIVERSITY R&DB FOUNDATION, Seoul (KR)

(72) Inventors: Byonghyo Shim, Seoul (KR); Yongjun Ahn, Seoul (KR)

(73) Assignee: Seoul National University R&DB Foundation, Seoul (KR)

( * ) Notice: Subject to any disclaimer, the term of this patent is extended or adjusted under 35 U.S.C. 154(b) by 16 days.

(21) Appl. No.: 18/038,357

(22) PCT Filed: Nov. 1, 2021

(86) PCT No.: PCT/KR2021/015558
§ 371 (c)(1),
(2) Date: May 23, 2023

(87) PCT Pub. No.: WO2022/114561
PCT Pub. Date: Jun. 2, 2022

(65) Prior Publication Data
US 2023/0412429 A1 Dec. 21, 2023

(30) Foreign Application Priority Data

Nov. 27, 2020 (KR) ........................ 10-2020-0162482

(51) Int. Cl.
*H04L 25/02* (2006.01)

(52) U.S. Cl.
CPC ................ *H04L 25/0254* (2013.01)

(58) Field of Classification Search
None
See application file for complete search history.

(56) References Cited

U.S. PATENT DOCUMENTS 6,614,466 B2 * 9/2003 Thomas ............. H04N 21/4223
704/235
7,831,679 B2 * 11/2010 Apacible ................. G06F 15/16
709/209
(Continued)

FOREIGN PATENT DOCUMENTS

CN 107743103 A * 2/2018 ......... H04L 25/0204
CN 107851050 A * 3/2018 ............... G06F 1/24
(Continued)

OTHER PUBLICATIONS

Donoho et al. Message-Passing-Algorithms-for-Compressed-Sensing, Sep. 2009 (Year: 2009).*
(Continued)

*Primary Examiner* — Berhanu Tadese
(74) *Attorney, Agent, or Firm* — Fenwick & West LLP

(57) ABSTRACT

Provided is an active user detection and channel estimation method of a base station in a wireless communication system based on grant-free uplink transmission. The method, according to one embodiment, comprises the steps of: receiving superimposed signals ($\bar{y}$) from k active terminals; by using a first artificial neural network and using the received signals ($\bar{y}$) as input, calculating, for all terminals in a cell of a base station, an estimated probability ($\hat{\Omega}$) of each of the terminals being an active terminal; and estimating channels of the active terminals by using a second artificial neural network and using the received signals ($\bar{y}$) and an active user detection result value as input.

8 Claims, 8 Drawing Sheets

(56) References Cited

U.S. PATENT DOCUMENTS

| | | | | |
|---|---|---|---|---|
| 7,854,009 | B2* | 12/2010 | Kim | H04L 63/08 |
| | | | | 713/1 |
| 10,462,622 | B2* | 10/2019 | Yan | H04L 51/226 |
| 10,466,802 | B2* | 11/2019 | Pantelopoulos | G06F 1/163 |
| 10,476,565 | B2* | 11/2019 | Hong | H04L 5/0044 |
| 10,750,404 | B2* | 8/2020 | Misra | H04L 65/80 |
| 10,917,192 | B2* | 2/2021 | Pajovic | H04B 1/709 |
| 10,958,318 | B2* | 3/2021 | Hong | H04B 7/0617 |
| 2008/0276270 | A1* | 11/2008 | Kotaru | H04N 21/2668 |
| | | | | 725/34 |
| 2018/0278303 | A1* | 9/2018 | Hong | H04B 7/0456 |
| 2019/0044588 | A1* | 2/2019 | Hong | H04L 5/0048 |
| 2019/0147713 | A1 | 5/2019 | Devison et al. | |
| 2020/0015121 | A1* | 1/2020 | Misra | H04L 65/752 |
| 2020/0295863 | A1* | 9/2020 | Pajovic | H04B 1/709 |
| 2023/0412429 | A1* | 12/2023 | Shim | H04L 25/0254 |

FOREIGN PATENT DOCUMENTS

| | | | | | |
|---|---|---|---|---|---|
| CN | 107860100 | A | * | 3/2018 | |
| CN | 110728314 | A | * | 1/2020 | G06K 9/6256 |
| CN | 107743103 | B | * | 2/2020 | H04L 25/0204 |
| CN | 111865845 | A | * | 10/2020 | |
| CN | 107851050 | B | * | 4/2021 | G06F 1/24 |
| CN | 111901069 | B | * | 8/2022 | G06N 3/08 |
| CN | 110728314 | B | * | 10/2022 | G06K 9/6256 |
| EP | 1143735 | A1 | * | 10/2001 | G06T 9/001 |
| JP | 2020150539 | A | * | 9/2020 | G06N 3/0454 |
| JP | 7186738 | B2 | * | 12/2022 | G06N 3/0454 |
| KR | 10-2019-0014928 | A | | 2/2019 | |
| KR | 10-2020-0057608 | A | | 5/2020 | |
| KR | 10-2020-0066220 | A | | 6/2020 | |
| KR | 10-2020-0130970 | A | | 11/2020 | |
| RU | 2316051 | C2 | * | 1/2008 | |
| WO | WO-2019161857 | A1 | * | 8/2019 | A61B 5/0008 |
| WO | WO-2019161858 | A1 | * | 8/2019 | A61B 5/0002 |
| WO | WO-2022114561 | A1 | * | 6/2022 | G06N 3/02 |

OTHER PUBLICATIONS

PCT International Search Report, PCT/KR2021/015558, Jan. 25, 2022, 6 Pages.

Ahn, Y., et al., "Deep Neural Network-based Joint Active User Detection and Channel Estimation for mMTC," Jun. 10, 2020, IEEE ICC 2020.

Kim, W., et al., Deep Neural Network-Based Active User Detection for Grant-Free NOMA Systems, Jan. 24, 2020, IEEE Transactions on Communications, vol. 68, Issue 4, pp. 2143-2155.

* cited by examiner

ACTIVE USER DETECTION AND CHANNEL ESTIMATION METHOD AND DEVICE, USING DEEP NEURAL NETWORK

TECHNICAL FIELD

The present invention relates to a method and device for an active user detection (AUD) and a channel estimation (CE) in a wireless communication system based on grant-free uplink transmission, and more particularly to a method and device for an active user detection and a channel estimation in a wireless communication system based on grant-free uplink transmission that utilizes a deep neural network to improve active user detection performance and channel estimation performance.

DESCRIPTION OF NATIONAL SUPPORT RESEARCH AND DEVELOPMENT

The present application was supported by the Ministry of Science and ICT, Information and Communication Technology Broadcasting Innovation Human Resource and Development (R&D) Project [Fostering Core Human Resources for Convergence of 5G and Unmanned Vehicle (Autonomous Vehicles, Drones, etc.) Industries, Project Number: 1711125747, Subproject Number: 2017-0-01637-005].

BACKGROUND ART

In addition to mMTC scenarios, the fifth-generation mobile communication is also considering enhanced mobile broadband (eMBB) and ultra-reliable and low-latency communication (URLLC) to increase efficiency in transmitting large amounts of data on the existing system. In Long Term Evolution (LTE), the existing fourth generation of mobile communications, a terminal transmits a signal called a preamble to connect to a target cell during a random access process of the terminal, and a base station transmits uplink synchronization information, and assigns a unique ID of the terminal and uplink data channel resources to a device that attempts to connect.

However, in case of the random access of LTE, the number of preambles is limited, which increases probability of preamble collisions in case of massive machine-type-communication (mMTC), where many machine-type terminals exist in a cell and send small amounts of data competitively. Therefore, due to the limited number of available preambles in the existing LTE and heavy control signals compared to the small amount of data, research is being carried out in a direction of newly constituting the communication method and frame of the existing system.

Specifically, the research on grant-free (GF) systems utilizing non-orthogonal multiple access (NOMA)-based technologies such as low density spreading (LDS) method and sparse code multiple access (SCMA) method is being carried out.

However, when this grant-free based one-shot random access is performed, since each device transmits information without scheduling, the base station needs a process to detect an active terminal and a process to estimate a channel of the detected terminal.

DISCLOSURE

Technical Problem

The present disclosure has been made in an effort to solve the above-mentioned problems, and an object of the present disclosure is to provide a method and device for an active user detection and a channel estimation, which detects active terminals using a network of short- and long-term memory to support mMTC and supports uplink communication of numerous terminals even in an mMTC system without an acknowledgment signal.

Technical problem to be solved by the present disclosure are not limited to the above-mentioned technical problems, and other technical problems, which are not mentioned above, may be clearly understood from the following descriptions by those skilled in the art to which the present disclosure pertains.

Technical Solution

A base station device according to an embodiment of the present invention is a base station device for an active user detection in a wireless communication system based on grant-free uplink transmission, the base station device including: a receiver configured to receive superimposed signals ($\bar{y}$) from k active terminals; and one or more processors configured to control an operation of the receiver, wherein the one or more processors: calculates, using a first artificial neural network and using the received signals ($\bar{y}$) as input, an estimated probability ($\hat{\Omega}$) that each of all terminals in a cell of the base station is an active terminal; and estimates channels of the active terminals using a second artificial neural network with the received signal ($\bar{y}$) and an active user detection result value as input.

An active user detection and channel estimation method according to another embodiment of the present invention is an active user detection and channel estimation method of a base station in a wireless communication system based on grant-free uplink transmission, the active user detection and channel estimation method including: receiving superimposed signals ($\bar{y}$) from k active terminals; calculating, using a first artificial neural network and using the received signals ($\bar{y}$) as input, an estimated probability ($\hat{\Omega}$) that each of all terminals in a cell of the base station is an active terminal; and estimating channels of the active terminals using a second artificial neural network with the received signal ($\bar{y}$) and an active user detection result value as input.

Advantageous Effects

An active user detection and channel estimation method using long short-term memory networks and a device according to an embodiment of the present invention, in which a terminal (transmitting end) modulates and transmits data and pilot using a low-density spreading code to support a large number of IoT communications, and a base station (receiving end) detects active terminals from a received signal using a first artificial neural network based on a long short-term memory (LSTM), and estimates channels of the active terminals using a second artificial neural network based on a long short-term memory.

That is, by utilizing long short-term memory (LSTM) networks as a core structure, a number of solution candidates may be compared and the most promising solution derived, and by learning direct mappings, errors that occur in the middle of the process of the existing compressed sensing techniques may be avoided.

Further, an active user detection and channel estimation method and a device using long short-term memory networks may provide robustness that is less sensitive to an increase in the number of active terminals, and thus may be more suitable to be applied to real networks.

In particular, a second artificial neural network (L-CE) is trained to control an inter-device interference that occurs in the NOMA system to obtain an independent channel value corresponding to each terminal, so that performance degradation of a channel estimation due to the inter-device interference may be relieved.

The effects obtained by the present invention are not limited to the aforementioned effects, and other effects, which are not mentioned above, will be clearly understood by those skilled in the art from the following description.

MODE FOR DISCLOSURE

Figure 1:
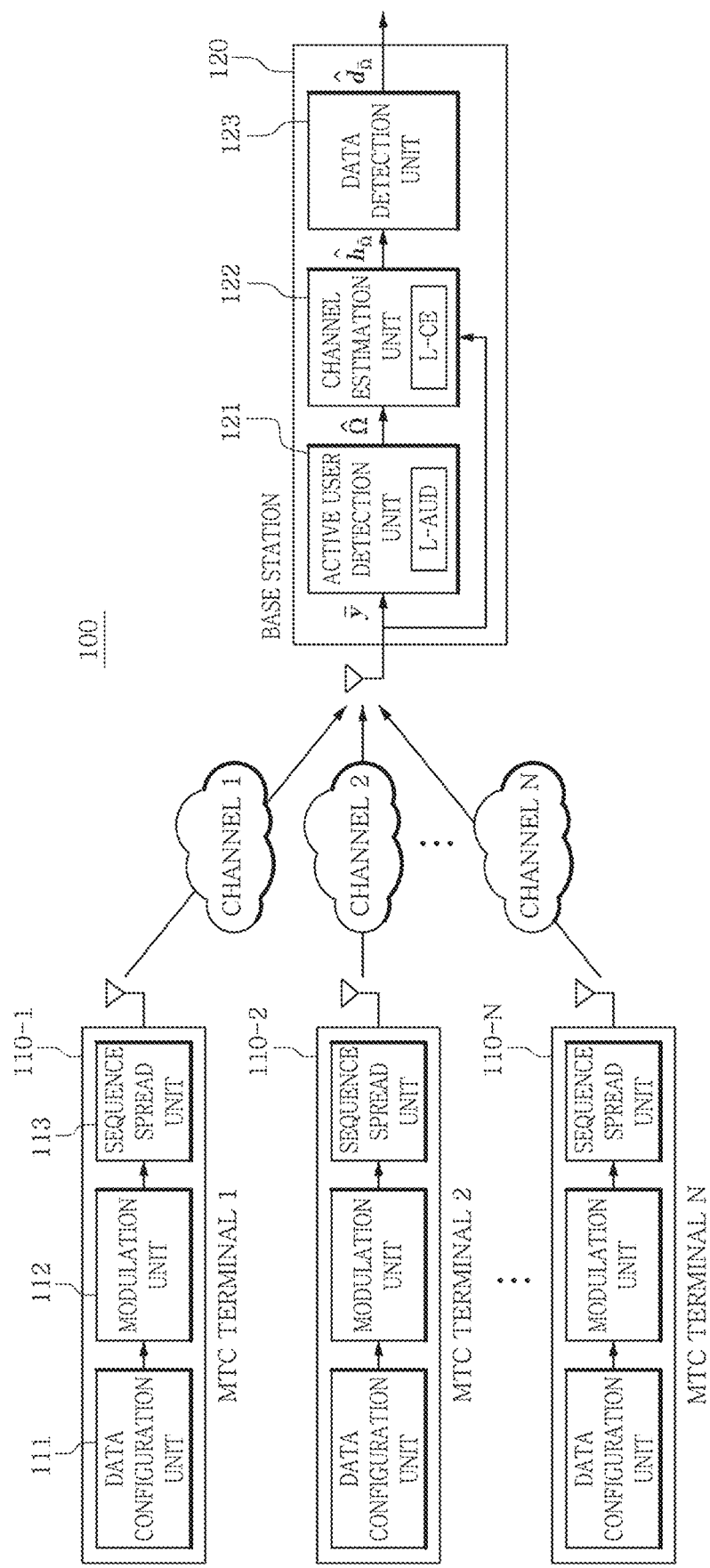
FIG. 1 illustrates a block diagram of a mobile communication network providing a mMTC service according to an embodiment of the present invention.

Advantages and features of the present invention and methods of achieving the advantages and features will be clear with reference to exemplary embodiments described in detail below together with the accompanying drawings. However, the present disclosure is not limited to the exemplary embodiments disclosed herein but will be implemented in various forms. The exemplary embodiments of the present disclosure are provided so that the present disclosure is completely disclosed, and a person with ordinary skill in the art can fully understand the scope of the present disclosure. The present disclosure will be defined only by the scope of the appended claims. Throughout the specification, the same reference numerals denote the same constituent elements.

In describing embodiments of the present invention, where it is determined that a detailed description of a known feature or configuration would unnecessarily obscure the essence of the present invention, such detailed description will be omitted, and the following terms are defined in consideration of the features of embodiments of the present invention, which may vary depending on user, operator intent or convention. Therefore, the definition of the present invention should be made based on the entire contents of the present specification.

Combinations of respective blocks of the attached block diagram and respective steps of the attached flow chart can be implemented by computer program instructions (processing engines). These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Each block may represent a module, segment, or portion of code, which comprises one or more executable instructions for implementing the specified logical function(s). It should also be noted that in some alternative implementations, the functions noted in the blocks may occur out of order. For example, two blocks shown in succession may in fact be executed substantially concurrently or the blocks may sometimes be executed in reverse order, depending upon the functionality involved.

Hereinafter, an embodiment of the present invention will be described with reference to the accompanying drawings. However, the following exemplary embodiments of the present invention may be modified in many other ways, and the scope of the present invention is not limited to the embodiments described below. The embodiments of the present invention are provided to more fully illustrate the present invention to one of ordinary skill in the art.

According to the fifth generation mobile communications requirements of the ITU-R, the number of terminals with access to the Internet of Things network is expected to reach approximately one million ($10^6$) per $km^2$ around the year 2020. Considering that LTE-Advanced systems have about 300 to 400 accessed users per base station, in order to support a large number of accessed IoT devices, it is necessary to install additional base stations to reduce the coverage of each cell or allocate additional resources proportional to the number of distributed terminals.

However, these solutions are not effective in a situation where mobile communication frequency resources are absolutely scarce. For example, in an IoT environment, when approximately 5% of all terminals are accessed simultaneously, approximately 20 terminals will attempt to access using 64 preambles when applied to an LTE environment with an average of 400 terminals.

In this case, there is a 96% probability that at least two terminals in a cell will collide using the same preamble, and approximately 2.5 million resources will be required to support the access of one million IoTs while maintaining the same number of terminals and preamble ratio. That is, with a coverage of 0.01 $km^2$ per cell, the number of resources required per cell is 25,000, which is more than 20 times the number of multi-access resources used by the current system, which is not very realistic. Therefore, supporting mMTC requires a different resource allocation and access process than conventional technologies.

In LTE, the fourth generation of mobile communication, the terminal transmits a preamble signal to access a target cell during the random access of the terminal. Since 64 preambles are typically used, many terminals require a total of four steps of accessing to successfully connect. Through these processes, the base station transmits uplink synchronization information to devices attempting to connect, assigns a unique ID to the terminal, and allocates uplink data channel resources.

However, in case of the random access of LTE, the number of preambles is limited, which increases probability of preamble collisions in case of mMTC, where many machine-type terminals exist in a cell and send small amounts of data competitively. In addition, the overhead of control signaling for connection is significantly increased in case of mMTC with a large number of terminals by using a multi-stage accessing process, and such a multiple access process is also inefficient from an energy perspective for MTC terminals that are expected to transmit a small amount of data (e.g., around 100 bits).

Therefore, in addition to mMTC scenarios, the fifth generation of mobile communications is also considering eMBB to increase efficiency in the process of transmitting large amounts of data in existing systems and URLLC for high-reliability, low-latency communications. In other words, due to the limited number of available preambles in existing LTE and the heavy control signals compared to the small amount of data, research is being conducted in the direction of newly configuring the communication method and frame of the existing system, and specifically, research on grant-free systems utilizing NOMA-based technologies such as LDS schemes and SCMA schemes.

However, with grant-free, one-shot random access, the base station is unable to properly receive the data channel because the base station does not know timing information and IDs of the devices. That is, since this scheme has no user conflict resolution process and user identification process, media access control (MAC) frame structure needs to be designed to demodulate received data symbols and obtain user identification information from the demodulated signal.

Specifically, the MAC frame needs to be designed to transmit core information such as active information (information that indicates an active state of a sensor), a thing ID (a unique ID for each sensor that indicates who produced sensing data received), and sensing information (information collected by the sensor). A transmitting physical layer structure and a receiving algorithm or scheme need to be ensured that each piece of information is effectively carried over the transmitting frame structure of a physical layer. Therefore, the present invention is based on a scenario in which the active information is obtained as output of a first artificial neural network trained with a measurement value received via a preamble transmission as input. Hereinafter, the present invention proposes a method and device for obtaining such active information and detecting active terminals in an active state.

Figure 2:
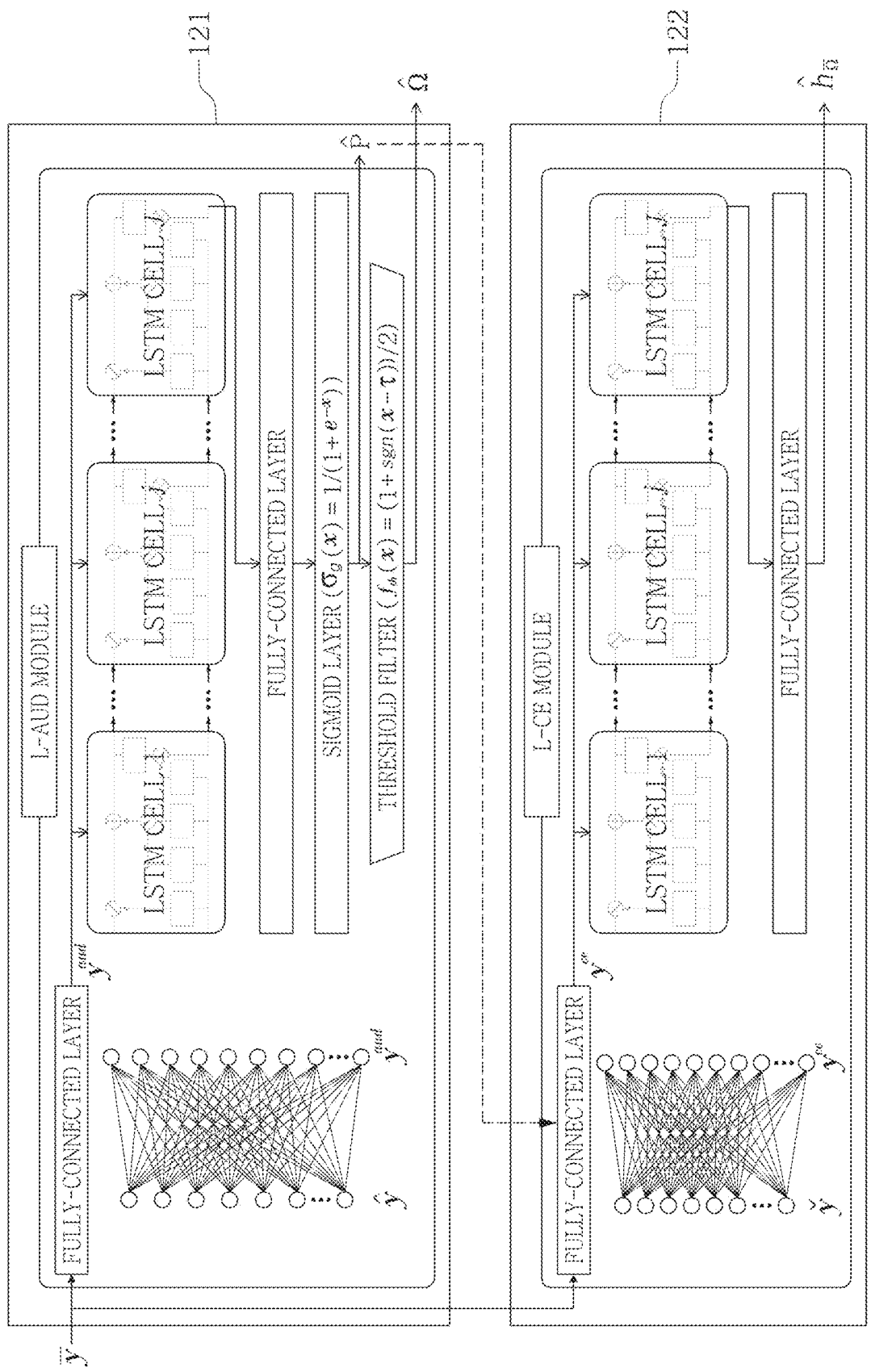
FIG. 2 illustrates a first artificial neural network (L-AUD) structure and a second artificial neural network (L-CE) structure of an active user detection unit according to an embodiment of the present invention.
Figure 3:
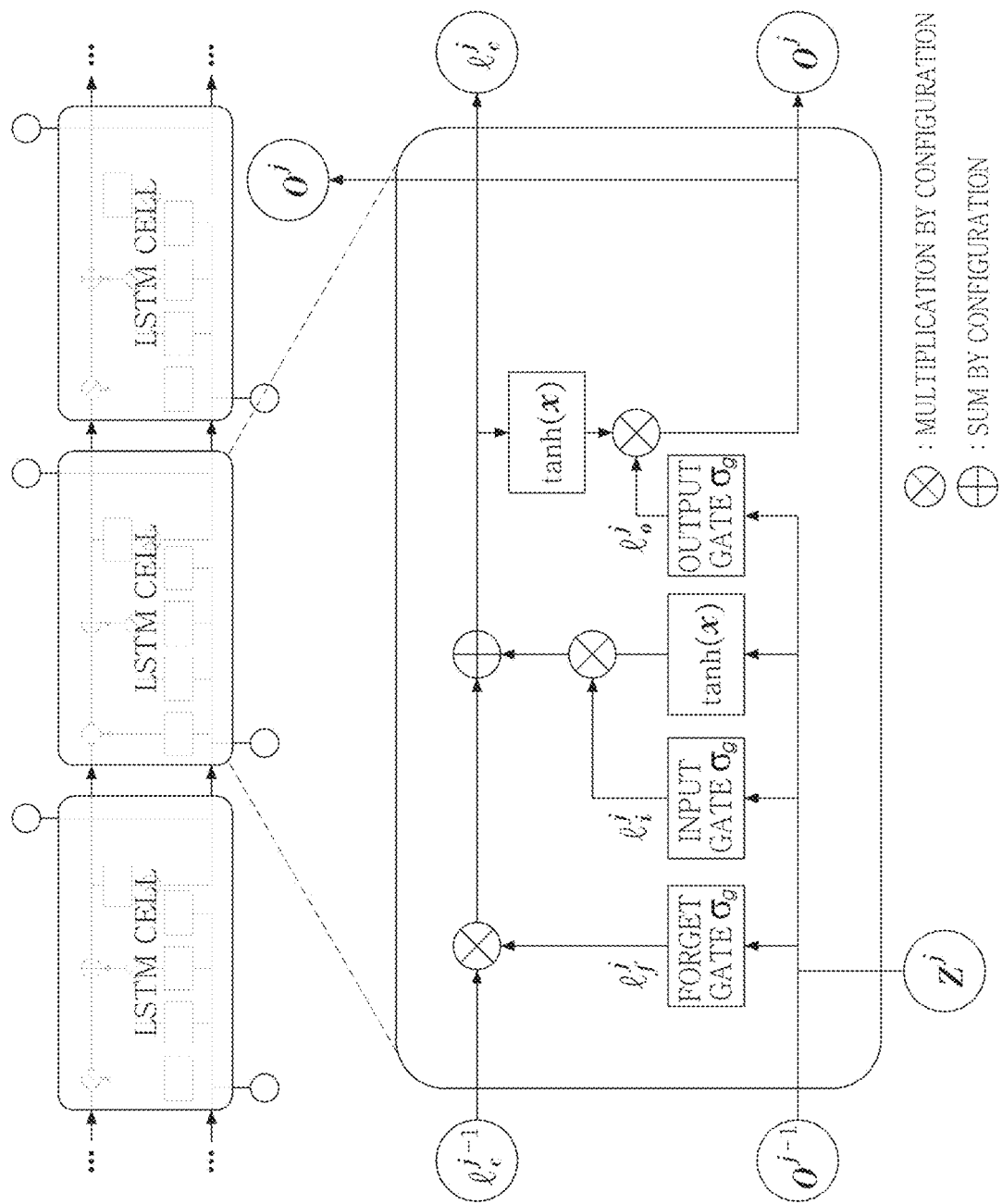
FIG. 3 illustrates a detailed structure of a LSTM cell of the first artificial neural network (L-AUD).

FIG. 1 illustrates a block diagram of a mobile communication network 100 providing a mMTC service according to an embodiment of the present invention. FIG. 2 illustrates a first artificial neural network (L-AUD) structure and a second artificial neural network (L-CE) structure of an active user detection unit according to an embodiment of the present invention. FIG. 3 illustrates a detailed structure of a LSTM cell of the first artificial neural network (L-AUD).

With reference to FIG. 1, the mobile communication network 100 includes a plurality of MTC terminals 110-1, . . . , 110-N and a base station 120 that transmits and receives signals to and from the plurality of MTC terminals 110-1, . . . , 110-N under coverage.

In some embodiments, the MTC terminal 110 may be an electronic device that provides mobility. The MTC terminal 110 may receive data from the base station 120, or may receive control information on the data. The control information may include information on downlink scheduling. Depending on the type of network, the MTC terminal 110 may also be referred to by other well-known terms such as "user equipment (UE)", "mobile station", "subscriber station", "remote terminal", "wireless terminal", or "user device". According to an embodiment of the present invention, the MTC terminal 110 may be one of a variety of MTC terminals, including sensors, home appliances, vehicles, and the like.

Depending on the type of network, the base station 120 may be referred to as an "access point (AP)", "gNodeB" or "gNB", a transmission reception point (TRP), or the like, in addition to "base station". Hereinafter, for convenience, the base station 120 may be used in the present patent document to refer to network infrastructure components that provide wireless access to remote terminals.

In the present invention, the mobile communication network 100 utilizes an uplink system, in which one antenna of the base station 120 receives information from the plurality of MTC terminals 110-1, . . . , 110-N under coverage. In particular, in the present invention, the mobile communication network 100 configures an environment where M<N such that the total number N of MTC terminals 110-1, . . . , 110-N is greater than the number M of resources. It is assumed that the number of terminals, N, is much larger than the number of resources, M, to reduce the load of control signals, and it is an important problem to detect active terminals from the received signals based on grant-free uplink transmission. The plurality of MTC terminals 110-1, . . . , 110-N have all completed an initial connection process, and all terminals in a cell of the base station 120 have unique user IDs that are distinguishable from each other assigned by the base station 120. A new terminal that attempts to further access the mobile communication network 100 needs to undergo a process of obtaining a user ID from the base station 120 via a random access channel (RACH) or the like.

As illustrated in the block diagram of FIG. 1, which represents a system model according to an embodiment of the present invention, active terminals of the plurality of MTC terminals 110-1, . . . , 110-N map each symbol to a symbol of length Ls via sequence spreading, in which a low-density spreading codebook is used.

Unlike code multiplexing with orthogonal codes used for multi-user transmission, a low density spreading (LDS) scheme uses non-orthogonal codes to spread signals, and may support a large number of terminals even in non-orthogonal situations by allocating the resources used for transmission in a sparse pattern unique to each user. In addition, a compressed sensing (CS) scheme is a technique that effectively recovers an original signal when a signal to be recovered is sparse (e.g., active user detection, channel estimation in the time domain), but the proposed active user detection utilizes deep learning techniques that go beyond these compressed sensing schemes.

The active terminals may configure data and pilot symbols desired to be transmitted. MTC active terminals may configure Ls symbols (consisting of LP pilot symbols and Ls data symbols), modulate the configured symbols, and transmit signals to a transmitter via sequence spreading with LDS codes corresponding to the data using non-orthogonal LDS codes. To this end, each MTC terminal 110 may include a data configuration unit 111, a modulation unit 112, and a sequence spread unit 113. For example, the MTC terminal 110 may include one or more processors, and functions of the data configuration unit 111, the modulation unit 112, and the sequence spread unit 113 may be performed by at least one processor. A receiver of the base station 120 receives signals over channels from the active terminals of the plurality of MTC terminals 110-1, . . . , 110-N. When detecting the active terminal, the base station 120 distinguishes the different terminals using an index 1 to N assigned to each of the plurality of MTC terminals 110-1, . . . , 110-N.

At the receiver of the base station 120, signals transmitted from each active terminal are superimposed and received. The received signal is represented by the following [Equation 1].

$$y = \sum_{i=1}^{N} \mathrm{diag}(s_i) h_i d_i + v = S_X + v \quad \text{[Equation 1]}$$

In Equation 1, $s_i$ is an LDS code vector of data from the i-th terminal, and $h_i$ is a channel vector corresponding to data from the i-th terminal. In addition, $d_i$ represents a data symbol transmitted by the i-th terminal, and V is a Gaussian noise vector of the data at the receiver, respectively. S=[diag $(s_1) \ldots \mathrm{diag}(s_N)$] means a codebook matrix of all terminals, and $x=[x_1 \ldots x_N]^T=[(h_1 d_1)^T \ldots (h_N d_N)^T]^T$ is a composite vector consisting of symbols and channels.

Since each of the plurality of MTC terminals 110-1, . . . , 110-N transmits Ls symbols, an accumulated vector ($\overline{y}$) of a measurement value y at the base station 120 is expressed as the following [Equation 2].

$$\overline{y} = \begin{bmatrix} S^{(1)} & 0 & \cdots & 0 \\ 0 & S^{(2)} & \cdots & 0 \\ \vdots & \vdots & \ddots & \vdots \\ 0 & 0 & \cdots & S^{(L_s)} \end{bmatrix} \begin{bmatrix} x^{(1)} \\ x^{(2)} \\ \vdots \\ x^{(L_s)} \end{bmatrix} + \begin{bmatrix} v^{(1)} \\ v^{(2)} \\ \vdots \\ v^{(L_s)} \end{bmatrix} \quad \text{[Equation 2]}$$

In Equation 2, $S^{(i)}=[\mathrm{diag}(s_{1,i}) \ldots \mathrm{diag}(s_{N,i})]$ is a diagonalized matrix of codewords of all terminals corresponding to the i-th symbol, $x^{(i)}=[x_{1,i} \ldots x_{N,i}]^T=[(h_{1,i}d_{1,i})^T \ldots (h_{N,i}d_{N,i})^T]^T$ is a vector representing symbols and channel vectors of all terminals corresponding to the i-th symbol, and $v^{(i)}$ is a Gaussian noise vector corresponding to the i-th symbol.

Here, by setting variables such as $\Psi_i=[\mathrm{diag}(s_i^{(1)}) \ldots \mathrm{diag}(s_i^{(L_s)})]$, $\overline{x}_i=[d_i^{(1)}h_i^{(1)})^T \ldots (d_i^{(L_s)}h_i^{(L_s)})^T]^T$, and $\overline{y}$ is expressed as the following Equation 3.

$$\overline{y} = [\Psi_1 \ldots \Psi_N] \begin{bmatrix} \delta_1 \overline{x}_1 \\ \vdots \\ \delta_N \overline{x}_N \end{bmatrix} + \begin{bmatrix} v^{(1)} \\ \vdots \\ v^{(L_s)} \end{bmatrix} = \Psi \overline{x} + v \quad \text{[Equation 3]}$$

Here, when $\delta_i=1$, an active terminal, and when $\delta_i=0$, an inactive terminal.

As such, a measurement value $\overline{y}$ of the superimposed signal may be obtained at the receiver of the base station 120. As described above, the base station 120 restores the signals of the active terminals by means of the channel estimation unit 122 and the data detection unit 123 via the active user detection unit 121, which takes the measurement value $\overline{y}$ of the received signal as input.

The active user detection unit 121 may calculate an active terminals estimated probability ($\hat{\Omega}$) in response to the input $\overline{y}$. The active user detection unit 121 may detect IDs of the active terminals in an order with a large estimated probability. The channel estimation unit 122 receives the input $\overline{y}$ and the estimated probability of the active user detection unit 121 and estimates ($\hat{h}_{\overline{\Omega}}$) the channel of the active terminals. The data detection unit 123 detects the data signal ($\hat{d}_{\overline{\Omega}}$) included in the received signal. That is, in a GF-NOMA system, since each terminal transmits packets freely without scheduling, the base station 120 is required to identify active terminals transmitting packets prior to symbol detection and packet decoding.

The base station 120 may include a receiver that receives superimposed signals from a plurality of active terminals; and one or more processors that control an operation of the receiver. Further, functions of the channel estimation unit 122, the data detection unit 123 may be performed by at least one processor. That is, the one or more processors may utilize a first artificial neural network based on long short-term memory networks to calculate an estimated probability that all terminals in a cell of the base station are active terminals, respectively, using the received signals as input. In addition, the processor may detect IDs of the k active terminals in an order in which the estimated probability is large. Further, the processor may use a second artificial neural network to estimate the channel of the active terminals using the received signals and the estimated probability of the data detection unit as inputs.

The mobile communication network 100 of the present invention assumes that only a small number of terminals are active. In this case, when k out of a total of N terminals are active, $\overline{x}$ is a sparse vector with k×T nonzero elements and a block-wise sparse vector because there are T nonzero elements, totaling k×T. The number of the k active terminals is sparsely smaller than the number of all terminals in the cell, such that the input signal may be a block-wise sparse vector.

As such, the measurement value $\overline{y}$, which is received as a block-wise sparse vector, may be input to the active user detection unit 121 structure described in the block diagram illustrated in FIG. 2 to perform active user detection, i.e., AUD. Furthermore, the measurement value $\overline{y}$ of the received block-wise sparse vector and the estimated probability ($\hat{p}$) of the active user detection unit 121 may be input to the channel estimation unit 122 structure described in the block diagram as illustrated in FIG. 2 to estimate the channel of the active terminals, i.e., to perform CE.

The active user detection unit 121 may include a trained first artificial neural network (L-AUD), in which the first artificial neural network may be a deep neural network that consists of a plurality of fully-connected layers and LSTM cells. In addition, the channel estimation unit 122 may include a trained second artificial neural network (L-CE). The second artificial neural network may be a deep neural network that consists of many LSTM cells.

In the structure of the trained first artificial neural network, an input is an observation value $\overline{y}$ of the superimposed received signal that is received at the base station 120, and an output is a SoftMax vector representing probability that each of the N MTC terminals 110-1, ... 110-N are active terminals. Among those, k largest probabilities are selected to detect active terminals, and the corresponding estimation value is expressed as $\hat{\Omega}$, unlike $\Omega$, which represents an index of the original active terminals. The first artificial neural network may be automatically trained and established based on a large amount of synthesized data using a backpropagation algorithm in a direction that minimizes a cost function in Equation 4 below.

$$J_A(p, \hat{p}) = -\sum_{i=1}^{N} \{p_i \log \hat{p}_i + (1 - p_i)\log(1 - \hat{p}_i)\} \quad \text{[Equation 4]}$$

Here, $p_i$ represents probability that the i-th terminal is an active terminal, 1 for an active terminal and 0 for a non-active terminal. $\hat{p}_i$ is an estimation value of probability that the i-th terminal is an active terminal.

In order for the cost function to have a minimum value, the first artificial neural network (L-AUD) needs to correctly match active probabilities of all terminals, and the first artificial neural network (L-AUD) may be trained in such a direction. In particular, the first artificial neural network (L-AUD) does not require a process that needs a direct estimation of a transmitted signal value in the existing compressive sensing-based active user detection. That is, the first artificial neural network (L-AUD) may be established by learning a direct mapping, such as the following Equation 5, without intermediate steps required by the existing algorithms.

$$\hat{\Omega} = g_{aud}(\overline{y}; \theta_A) \quad \text{[Equation 5]}$$

Here, $\theta_A$ is a parameter of the first artificial neural network used for the active user detection.

A first fully-connected layer of the first artificial neural network (L-AUD) may change the input $\overline{y}$ to a hidden layer representation, $y^{aud} = W\hat{y} + b$. Here, $\hat{y}[\text{Real}(\overline{y})\text{Imag}(\overline{y})]$. The changed $y^{aud}$ is computed sequentially on a plurality of LSTM cells that perform an operation such as Equation 6 below. Equation 6 below is expressed with respect to the j-th LSTM cell as illustrated in FIG. 3.

$$\ell_f^j = \sigma_g(W_f \hat{y} + U_f o^{j-1} + b_f)$$
$$\ell_i^j = \sigma_g(W_i \hat{y} + U_i o^{j-1} + b_i)$$
$$\ell_o^j = \sigma_g(W_o \hat{y} + U_o o^{j-1} + b_o)$$
$$\ell_c^j = \sigma_g(W_c \hat{y} + U_c o^{j-1} + b_c)$$
$$\ell_c^j = \ell_f^j \circ \ell_c^{j-1} + \ell_i^j \circ \overline{\ell_c^j}$$
$$o^j = \ell_o^j \circ \tanh(\ell_c^j) \quad \text{[Equation 6]}$$

(Here, $W_f$, $W_i$, $W_o$, $W_c$, $U_f$, $U_i$, $U_o$, $U_c$, and $b_f$, $b_i$, $b_o$, $b_c$ are weights and deviations of the hidden layers, respectively, $\sigma_g$ is a sigmoid function, and tanh is a hyperbolic tangent function.

In the LSTM cell, an input gate, $\ell_i^j$, newly searches for candidate active terminals that could be $\Omega$ based on $o^{j-1}$, which is a result of the active user detection in the previous LSTM cell. A forget gate, $\ell_f^j$ deletes information from $\ell_c^{j-1}$ related to candidate active terminals that are less likely to become $\Omega$ based on $o^{j-1}$, which is the result of the active user detection of the previous LSTM cell. By repeating this process J times, the last J-th LSTM cell yields a result of the active user detection ($o^j$) that is closest to a correct answer among a number of possible solutions. The result of the active user detection ($o^j$) is transmitted via a second fully-connected layer to a sigmoid Layer, and a hidden layer representation $o^j$ of the result of the active user detection is converted to a probability vector estimation value, $\hat{p}$ for activity of the N terminals via a sigmoid function. The probability vector estimation value $\hat{p}$ may be converted to an active user detection probability ($\hat{\Omega}$) by means of a threshold filter.

In the present invention, a terminal (transmitting end) modulates and transmits data and pilot using low-density spreading code to support a large number of IoT communications, and the base station (receiving end) detects active terminals from the received signals using the first artificial neural network based on the long short-term memory (LSTM). By utilizing long short-term memory (LSTM) networks as a core structure, a number of solution candidates may be compared and the most promising solution derived, and by learning direct mappings, errors that occur in the middle of the process of the existing compressed sensing techniques may be avoided.

In the structure of the trained second artificial neural network, inputs are an observation value $\overline{y}$ of the superimposed received signal that is received at the base station 120 and estimated probability ($\hat{p}$) of the active user detection unit 121, and an output $\hat{h}_{\hat{\Omega}}$ is obtained by selecting a channel estimation value corresponding to the corresponding terminal from the estimated channel vectors for the N terminals. The second artificial neural network may be automatically trained and established based on a large amount of synthesized data using a backpropagation algorithm in a direction that minimizes a cost function in Equation 7 below.

$$J_C(h, \hat{h}) = -\sum_{i=1}^{N} \|h_i - \hat{h}_i\|_2^2 \quad \text{[Equaiton 7]}$$

Here, $h_i$ is a frequency axis channel value for the corresponding terminal and $\hat{h}_i$ is an estimation value for a channel value for the corresponding terminal.

In order for the cost function to have a minimum value, the second artificial neural network needs to correctly match channel estimations of the active terminals, and the second artificial neural network may be trained in such a direction. In particular, the second artificial neural network does not require a process that needs a direct estimation of a transmitted signal value in the existing compressive sensing-based active user detection. That is, the second artificial neural network may be established by learning a direct mapping, such as the following Equation 8, without intermediate steps required by the existing algorithms.

$$\hat{h}_{\hat{\Omega}} = g_{ce}(\overline{y}, \hat{\Omega}; \theta_C) \quad \text{[Equation 8]}$$

Here, $\theta_C$ is a parameter of the second artificial neural network used for the channel estimations.

The second artificial neural network (L-CE) may consist of a plurality of LSTM cells that perform individual operations like the first artificial neural network. However, since result values to be estimated are channel values, not probabilities, the second artificial neural network differs from the first artificial neural network in that the second artificial neural network does not use a $\breve{y}$ sigmoid function at the end, and uses $\breve{y}=[\hat{y}\hat{p}]$ that includes the result value of the active user detection ($\hat{p}$) as input.

In the LSTM cells of the second artificial neural network, an input gate, $\ell_i^j$ selects an independent uplink channel for each active terminal, and a forget gate, $\ell_f^j$ rejects channels for other terminals that interfere with the channel of the corresponding terminal. By repeating this process a total of J times, a hidden layer representation ($o^j$) of a channel corresponding to each of the N terminals in the last LSTM cell is calculated. That is, the second artificial neural network (L-CE) is trained to control an inter-device interference that occurs in the NOMA system to obtain an independent channel value corresponding to each terminal. In the NOMA system, where a number of terminals use the same radio resource to transmit pilot and data, the second artificial neural network (L-CE) may activate a channel characteristic of a particular terminal with an input gate, while deactivating channel characteristics of the remaining terminals with a forget gate.

In the present invention, the base station (receiving end) uses the second artificial neural network based on long short-term memory (LSTM) to estimate channels of the active terminals from the received signals. By utilizing long short-term memory (LSTM) networks as a core structure, a number of solution candidates may be compared and the most promising solution derived, and by learning direct mappings, errors that occur in the middle of the process of the existing compressed sensing techniques may be avoided. In addition, performance degradation of channel estimation due to the inter-device interference occurring in the NOMA environment can be relieved by means of the second artificial neural network utilizing a selective activation function.

Figure 4:
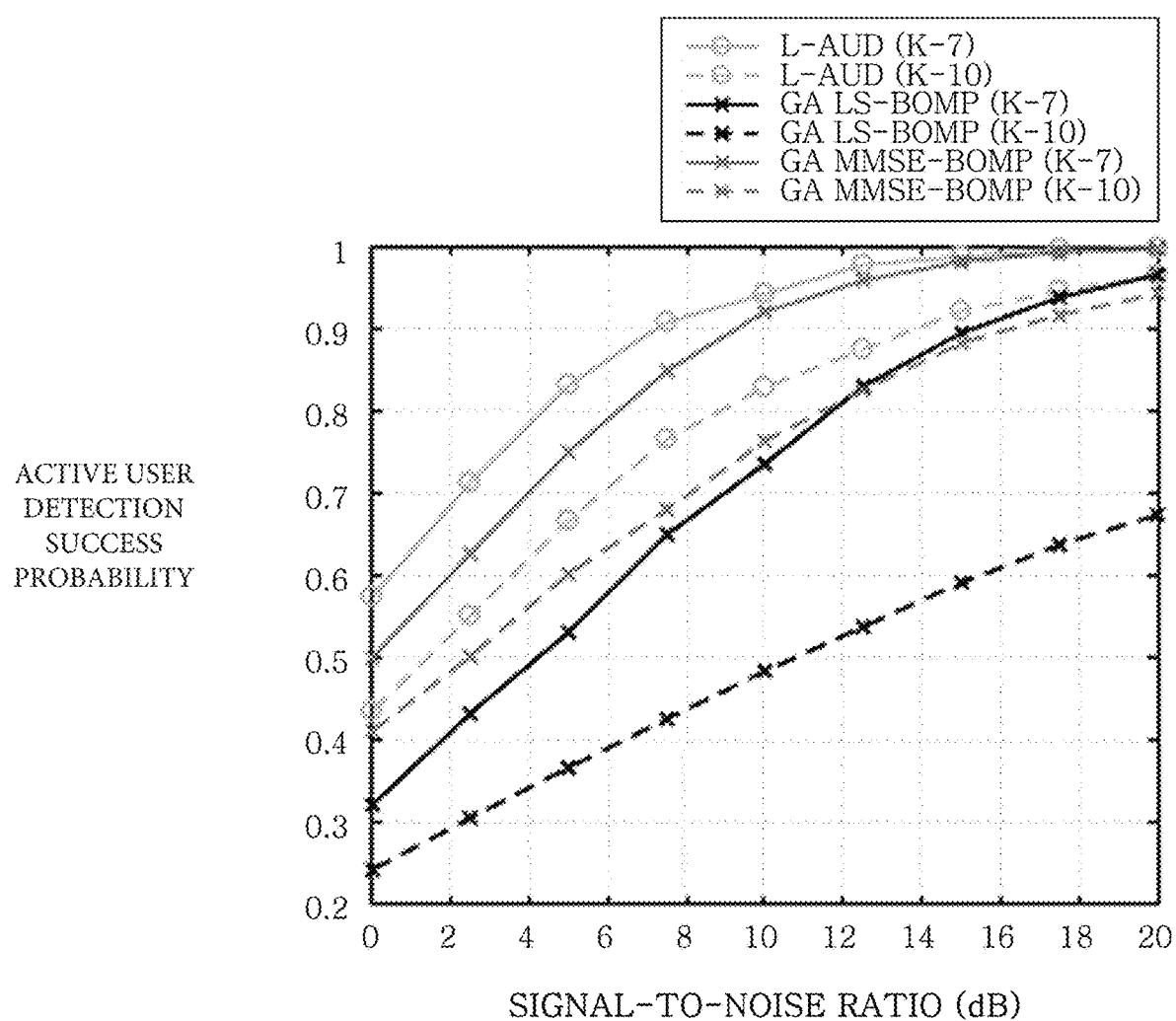
FIG. 4 illustrates a simulation result of the active user detection based on signal to noise ratio (SNR).
Figure 5:
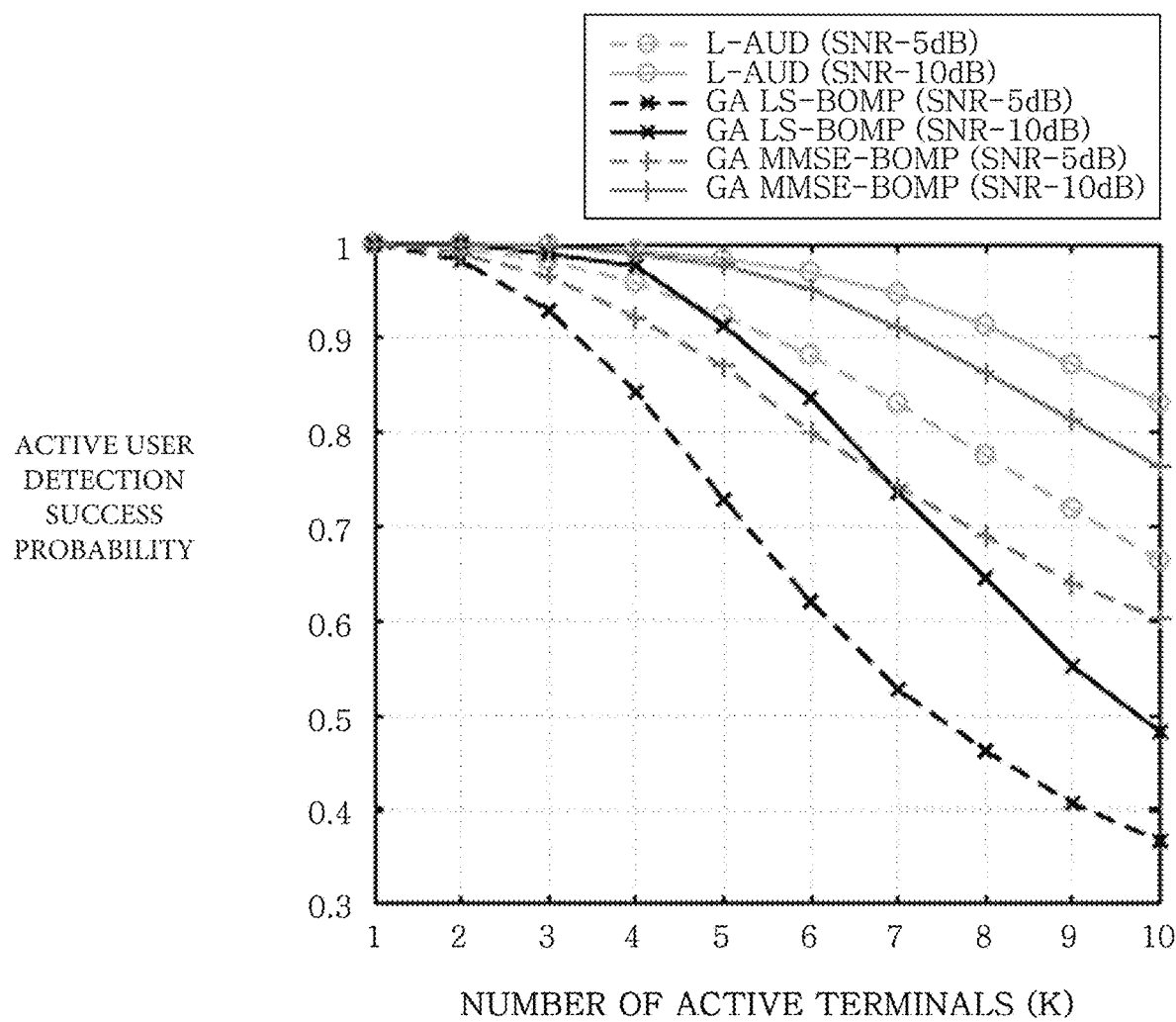
FIG. 5 illustrates a simulation result of the active user detection according to the number of active terminals.

Hereinafter, a performance comparison with the conventional method is illustrated in FIGS. 4 and 5 by performing the active user detection by inputting the measurement value that receives the block-wise sparse vector to the active user detection unit 121 as input. Specifically, FIG. 4 illustrates a simulation result of the active user detection based on signal to noise ratio (SNR). FIG. 5 illustrates a simulation result of the active user detection according to the number (K) of active terminals.

In the graphs of FIGS. 4 and 5, GA MMSE-BOMP represents a BOMP algorithm in case that MMSE technique is used for a sparse vector estimation with the number of active terminals known as prior information, GA LS-BOMP represents a BOMP algorithm in case that LS technique is used for a sparse vector estimation with the number of active terminals known as prior information, and the result of active terminals estimation by the first neural network (L-AUD) according to an embodiment of the present invention is denoted as L-AUD.

A simulation situation was configured with 8 pilot symbols and 16 data symbols, and a frequency selective Rayleigh fading channel with each terminal having up to 10% (=15) dominant channel taps in an uplink channel environment with a maximum delay spread of 4.88 us (=4.88 us×15 kHz×2048=150 samples).

With reference to FIG. 4, it may be seen that when probability of successful active user detection is 0.9, L-AUD obtains a 2 dB gain compared to GA MMSE-BOMP. This performance improvement corresponds to an improved result of learning direct mapping, as opposed to compressive sensing techniques, where there is degradation in estimation performance due to channel information that is not provided during detection.

With reference to FIG. 5, it may be seen that when the number (K) of active terminals increases from 6 to 10, a success rate of L-AUD decreases relatively small from 0.97 to 0.83, while the existing GA MMSE-BOMP algorithm decreases from 0.95 to 0.77, and GA LS-BOMP algorithm decreases significantly from 0.83 to 0.49. That is, it may be seen that the L-AUD according to an embodiment of the present invention has a robustness that is less sensitive to an increase in the number of active terminals. Therefore, it is implied that the active user detection by means of the L-AUD structure proposed in the present invention is more suitable for realistic scenarios, and also more suitable to be applied to real networks.

Figure 6:
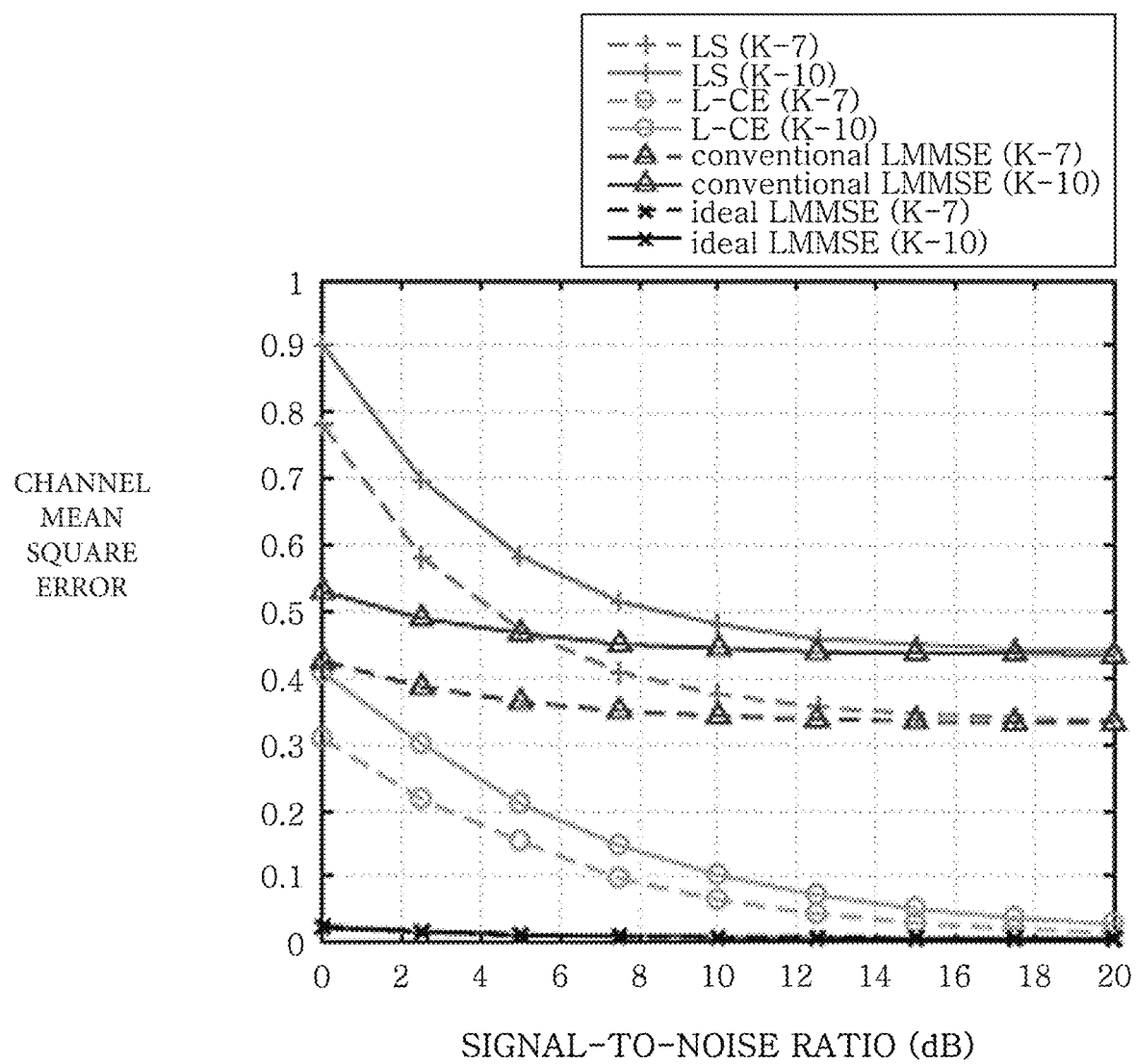
FIG. 6 is a graph illustrating a channel mean squared error (MSE) according to signal-to-noise ratio (SNR).
Figure 7:
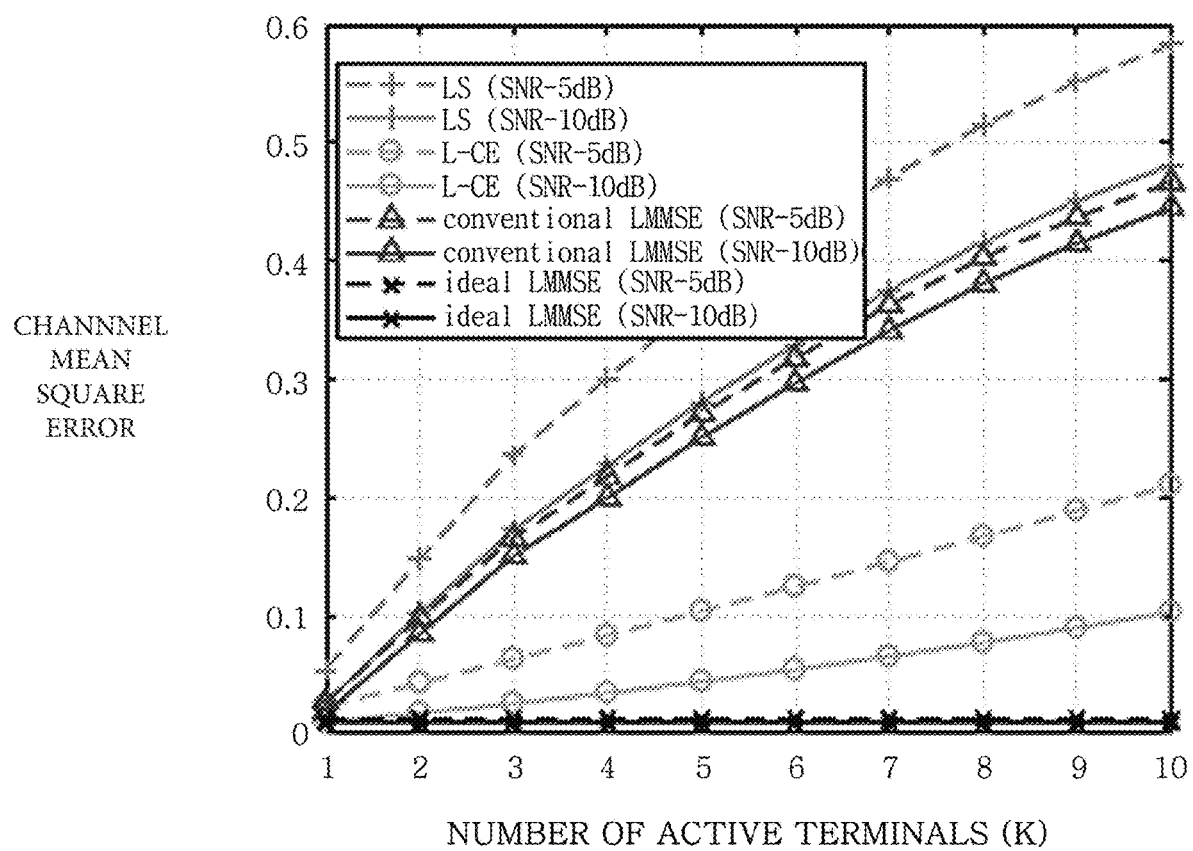
FIG. 7 is a graph illustrating the channel mean square error according to the number of active terminals (K).

Hereinafter, simulation results of channel estimation according to signal-to-noise ratio (SNR) and the number (K) of active terminals are illustrated in FIG. 6 and FIG. 7. FIG. 6 is a graph illustrating a channel mean squared error (MSE) according to a signal-to-noise ratio (SNR), and FIG. 7 is a graph illustrating a channel mean squared error according to the number (K) of active terminals.

In FIGS. 6 and 7, L-CE represents the second artificial neural network according to an embodiment of the present invention, LS represents the least squares algorithm, the conventional LMMSE represents a LMMSE algorithm when the channel covariance of each terminal obtained through 5 times of NOMA-based prior LS channel estimation is used as prior information, and ideal LMMSE represents an ideal LMMSE algorithm when the channel covariance of each terminal is perfectly known as prior statistics.

While the existing conventional LMMSE and LS techniques do not control the inter-device interference that occurs in the NOMA system, which limits the improvement of channel estimation performance even as the SNR increases, it may be seen from FIG. 6 that the proposed second artificial neural network (L-CE) is trained to control the inter-device interference and thus approaches the performance of the ideal LMMSE, which is the highest achievable performance standard, as the signal-to-noise ratio (SNR) increases.

In addition, it may be seen from the graph in FIG. 7 that the second artificial neural network (L-CE) is robust to an increase in the number of active terminals compared to the existing techniques since the second artificial neural network effectively controls inter-device interference, and thus the channel estimation performance is not significantly degraded.

Figure 8:
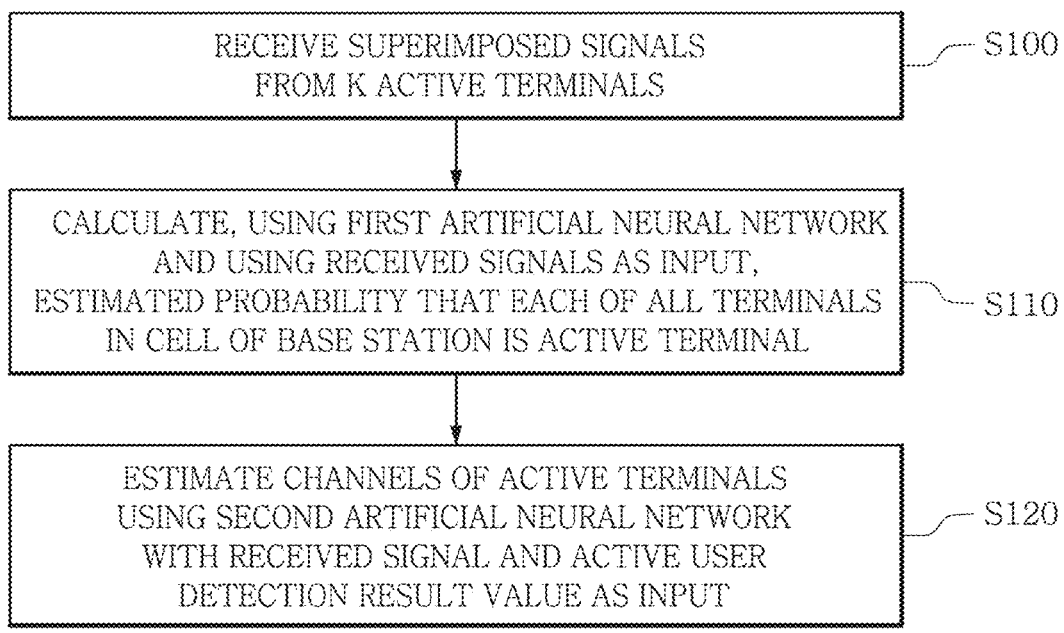
FIG. 8 is a flowchart of the active user detection and channel estimation method of a base station in a wireless communication system based on grant-free uplink transmission, according to another embodiment of the present invention.

FIG. 8 is a flowchart of the active user detection and channel estimation method of a base station in a wireless communication system based on grant-free uplink transmission, according to another embodiment of the present invention. Reference may be made to FIGS. 1 to 7 and the accompanying description for operations at the base station 20 described above in accordance with the present embodiment.

With reference to FIG. 8, an active user detection and channel estimation method according to another embodiment of the present invention includes the steps of receiving superimposed signals ($\overline{y}$) from k active terminals (S100); calculating, using a first artificial neural network, an estimated probability ($\hat{\Omega}$) that each of all terminals in a cell of the base station is an active terminal using the received signals ($\overline{y}$) as input (S110); and estimating channels of the active terminals using a second artificial neural network, using the received signal ($\overline{y}$) and an active user detection result value as input (S120).

In an embodiment, the first artificial neural network and the second artificial neural network may each be an artificial neural network based on long short-term memory networks.

In an embodiment, the first artificial neural network may be established by learning a direct mapping such as the following Equation 5, and the second artificial neural network may be established by learning a direct mapping such as the following Equation 8.

$$\hat{\Omega} = g_{aud}(\overline{y}; \theta_A) \qquad \text{[Equation 5]}$$

(Here, $\theta_A$ is a parameter of the first artificial neural network used for the active user detection.)

$$\hat{h}_{\hat{\Omega}} = g_{ce}(\overline{y}, \hat{\Omega}; \theta_C) \qquad \text{[Equation 8]}$$

(Here, $\theta_C$ is a parameter of the second artificial neural network used for the channel estimations.)

In addition, the received signals ($\overline{y}$) input to the first artificial neural network are changed into a hidden layer representation ($y^{aud}$) by passing through a fully-connected layer, and the changed hidden layer representation ($y^{aud}$) is calculated into a hidden layer representation ($o^j$) of the active user detection result by sequentially computing a plurality of LSTM cells, and the hidden layer representation ($o^j$) of the active user detection result may be converted into the estimated probability ($\hat{\Omega}$) by means of a sigmoid function.

Each of the plurality of LSTM cells may perform a computation such as Equation 6 below.

$$\ell_f^j = \sigma_g(W_f \hat{y} + U_f o^{j-1} + b_f)$$
$$\ell_i^j = \sigma_g(W_i \hat{y} + U_i o^{j-1} + b_i)$$
$$\ell_o^j = \sigma_g(W_o \hat{y} + U_o o^{j-1} + b_o)$$
$$\ell_c^j = \sigma_g(W_c \hat{y} + U_c o^{j-1} + b_c)$$
$$\ell_c^j = \ell_f^j \circ \ell_{c+}^j \ell_i^j \circ \overline{\ell_c^j}$$
$$o^j = \ell_o^j \circ \tanh(\ell_c^j) \qquad \text{[Equation 6]}$$

(Here, $W_f$, $W_i$, $W_o$, $W_c$, $U_f$, $U_i$, $U_o$, $U_c$, and $b_f$, $b_i$, $b_o$, $b_c$ are weights and deviations of the hidden layers, respectively, $\sigma_g$ is a sigmoid function, and tanh is a hyperbolic tangent function.

The number of the k active terminals is sparsely smaller than the number of all terminals in the cell, such that the input signal may be a block-wise sparse vector.

In step S100 of receiving the superimposed signals ($\overline{y}$) from the k active terminals, sequence spreading signals may be received using a non-orthogonal LDS code.

Further, the second artificial neural network may be trained to activate a channel characteristic of a specific terminal as an input gate and deactivate channel characteristics of the remaining terminals as a forget gate.

In the above-mentioned specific embodiments, the components included in the invention have been expressed as singular or plural components depending on the proposed specific embodiments. However, the singular or plural expression is appropriately selected for the situation proposed for the convenience of description, and the above-mentioned embodiments are not limited by the singular or plural expression. Therefore, the component expressed with a plural term may be configured in a singular form, or the component expressed with a singular term may be configured in a plural form.

While the specific embodiments according to the present invention have been described above, various modifications may be made without departing from the scope of the present invention contained in the various embodiments. Therefore, the scope of the present invention should not be limited to the described exemplary embodiments, and should be defined by not only the claims to be described below, but also those equivalent to the claims.

INDUSTRIAL APPLICABILITY

The present invention is mainly aimed at supporting mMTC, which is one of the service categories of the fifth generation (5G) of mobile communications, and the active user detection technique with improved performance proposed may be applicable to support the uplink communication of numerous terminals in an mMTC system which does not have an acknowledgment signal.

The invention claimed is:

1. An active terminal detection and channel estimation method of a base station in a wireless communication system based on grant-free uplink transmission, the method comprising:

receiving superimposed signals ($\overline{y}$) from k active terminals;

calculating, using a first artificial neural network and using the received signals ($\overline{y}$) as input, an estimated probability ($\hat{\Omega}$) that each of all terminals in a cell of the base station is an active terminal; and estimating channels of the active terminals using a second artificial neural network with the received signals ($\overline{y}$) and an active terminal detection result value as input, wherein the first artificial neural network and the second artificial neural network are each an artificial neural network based on long short-term memory (LSTM) networks, and wherein the first artificial neural network is established by learning a direct mapping according to Equation 5, and the second artificial neural network is established by learning a direct mapping according to Equation 8:

$$\hat{\Omega} = g_{and}(\overline{y}; \theta_A) \qquad \text{[Equation 5]}$$

wherein $\theta_A$ is a parameter of the first artificial neural network used for the active user detection, $$\hat{h}_{\hat{\Omega}} = g_{ce}(\overline{y}, \hat{\Omega}; \theta_C) \qquad \text{[Equation 8]}$$

wherein $\theta_C$ is a parameter of the second artificial neural network used for the channel estimations.

2. The active terminal detection and channel estimation method of claim 1, wherein the received signals ($\overline{y}$) input to the first artificial neural network are changed into a hidden layer representation ($y^{aud}$) by passing through a fully-connected layer, the changed hidden layer representation (yaud) is calculated into a hidden layer representation ($o^j$) of the active user detection result by sequentially computing a plurality of LSTM cells, and the hidden layer representation ($o^j$) of the active user detection result is converted into the estimated probability ($\hat{\Omega}$) by means of a sigmoid function.

3. The active terminal detection and channel estimation method of claim 2, wherein each of the plurality of LSTM cells performs a computation according to Equation 6:

$$\ell_f^j = \sigma_g(W_f \hat{y} + U_f o^{j-1} + b_f)$$

$$\ell_i^j = \sigma_g(W_i \hat{y} + U_i o^{j-1} + b_i)$$

$$\ell_o^j = \sigma_g(W_o \hat{y} + U_o o^{j-1} + b_o)$$

$$\ell_c^j = \sigma_g(W_c \hat{y} + U_c o^{j-1} + b_c)$$

$$\ell_c^j = \ell_f^j \circ \ell_c^{j-1} + \ell_i^j \circ \overline{\ell_c^j}$$

$$o^j = \ell_o^j \circ \tanh(\ell_c^j) \quad \text{[Equation 6]}$$

wherein $W_f$, $W_i$, $W_o$, $W_c$, $U_f$, $U_i$, $U_o$, $U_c$, and $b_f$, $b_i$, $b_o$, $b_c$ are weights and deviations of the hidden layers, respectively, $\sigma_g$ is a sigmoid function, and tanh is a hyperbolic tangent function.

4. The active terminal detection and channel estimation method of claim 1, wherein the second artificial neural network is trained to activate a channel characteristic of a specific terminal as an input gate and to deactivate channel characteristics of remaining terminals as a forget gate.

5. A base station device for an active user detection and channel estimation in a wireless communication system based on grant-free uplink transmission, the base station device comprising:

a receiver configured to receive superimposed signals ($\overline{y}$) from k active terminals; and one or more processors configured to control an operation of the receiver, wherein the one or more processors:

calculates, using a first artificial neural network and using the received signals ($\overline{y}$) as input, an estimated probability ($\hat{\Omega}$) that each of all terminals in a cell of the base station is an active terminal; and estimates channels of the active terminals using a second artificial neural network with the received signal ($\overline{y}$) and an active user detection result value as input, wherein the first artificial neural network and the second artificial neural network are each an artificial neural network based on long short-term memory (LSTM) networks, and wherein the first artificial neural network is established by learning a direct mapping according to Equation 5, and the second artificial neural network is established by learning a direct mapping according to Equation 8:

$$\hat{\Omega} = g_{aud}(\overline{y} ; \theta_A) \quad \text{[Equation 5]}$$

wherein $\theta_A$ is a parameter of the first artificial neural network used for the active user detection, $$\hat{h}_{\hat{\Omega}} = g_{ce}(\overline{y}, \hat{\Omega}; \theta_C) \quad \text{[Equation 8]}$$

wherein $\theta_C$ is a parameter of the second artificial neural network used for the channel estimations.

6. The base station device of claim 5, wherein the received signals ($\overline{y}$) input to the first artificial neural network are changed into a hidden layer representation ($y^{aud}$) by passing through a fully-connected layer, the changed hidden layer representation ($y^{aud}$) is calculated into a hidden layer representation ($o^j$) of the active user detection result by sequentially computing a plurality of LSTM cells, and the hidden layer representation ($o^j$) of the active user detection result is converted into the estimated probability ($\hat{\Omega}$) by means of a sigmoid function.

7. The base station device of claim 6, wherein each of the plurality of LSTM cells performs a computation according to Equation 6:

$$\ell_f^j = \sigma_g(W_f \hat{y} + U_f o^{j-1} + b_f)$$

$$\ell_i^j = \sigma_g(W_i \hat{y} + U_i o^{j-1} + b_i)$$

$$\ell_o^j = \sigma_g(W_o \hat{y} + U_o o^{j-1} + b_o)$$

$$\ell_c^j = \sigma_g(W_c \hat{y} + U_c o^{j-1} + b_c)$$

$$\ell_c^j = \ell_f^j \circ \ell_c^{j-1} + \ell_i^j \circ \overline{\ell_c^j}$$

$$o^j = \ell_o^j \circ \tanh(\ell_c^j) \quad \text{[Equation 6]}$$

wherein $W_f$, $W_i$, $W_o$, $W_c$, $U_f$, $U_i$, $U_o$, $U_c$, and $b_f$, $b_i$, $b_o$, $b_c$ are weights and deviations of the hidden layers, respectively, $\sigma_g$ is a sigmoid function, and tanh is a hyperbolic tangent function.

8. The base station device of claim 5, wherein the second artificial neural network is trained to activate a channel characteristic of a specific terminal as an input gate and to deactivate channel characteristics of remaining terminals as a forget gate.

* * * * *